(12) United States Patent
Takagi et al.

(10) Patent No.: US 11,325,193 B2
(45) Date of Patent: May 10, 2022

(54) CUTTING TOOL AND METHOD OF ASSEMBLING CUTTING TOOL

(71) Applicant: MITSUBISHI HEAVY INDUSTRIES COMPRESSOR CORPORATION, Tokyo (JP)

(72) Inventors: Hiroki Takagi, Hiroshima (JP); Yoshiki Tazawa, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 356 days.

(21) Appl. No.: 16/141,286

(22) Filed: Sep. 25, 2018

(65) Prior Publication Data
US 2019/0168312 A1 Jun. 6, 2019

(30) Foreign Application Priority Data
Dec. 6, 2017 (JP) .............................. JP2017-234548

(51) Int. Cl.
*B23C 5/10* (2006.01)
*B23B 31/107* (2006.01)
(Continued)

(52) U.S. Cl.
CPC ........ *B23B 31/1075* (2013.01); *B23B 31/005* (2013.01); *B23B 31/028* (2013.01);
(Continued)

(58) Field of Classification Search
CPC ....... B23C 5/10; B23C 5/1009; B23C 5/1045; B23C 5/1018; B23C 5/14; B23C 2240/32;
(Continued)

(56) References Cited

U.S. PATENT DOCUMENTS

| 756,339 | A | * | 4/1904 | Down | ........................... 408/233 |
| 2,079,692 | A | | 5/1937 | Lapointe | |

(Continued)

FOREIGN PATENT DOCUMENTS

| DE | 202013008019 U1 | 9/2013 |
| EP | 2769792 A1 | 8/2014 |

(Continued)

OTHER PUBLICATIONS

English translation of EP 3120958 (Year: 2019).*

*Primary Examiner* — Alan Snyder
(74) *Attorney, Agent, or Firm* — Osha Bergman Watanabe & Burton LLP

(57) ABSTRACT

A cutting tool comprises a shank having an insertion portion protruding from a shank main body, a head in which an insertion hole into which the insertion portion is inserted is formed, and a spacer disposed in a gap between the shank main body and the head. The insertion portion has a tapered outer circumferential surface which gradually decreases in diameter from the other side toward one side in the axial direction. The insertion hole has a tapered inner circumferential surface coming into surface contact with the tapered outer circumferential surface. A head end surface of the head which faces the other side in the axial direction comes into surface contact with a surface facing one side in the axial direction of the spacer.

8 Claims, 5 Drawing Sheets

(51) Int. Cl.
  *B23B 31/02* (2006.01)
  *B23B 31/00* (2006.01)
  *B23B 31/26* (2006.01)
  *B23P 15/28* (2006.01)
  *B23B 31/11* (2006.01)
  B23P 11/02 (2006.01)
  B23B 29/04 (2006.01)
  B23B 31/117 (2006.01)

(52) U.S. Cl.
  CPC ........ *B23B 31/1122* (2013.01); *B23B 31/263* (2013.01); *B23C 5/1045* (2013.01); *B23P 15/28* (2013.01); *B23B 29/046* (2013.01); *B23B 31/1175* (2013.01); *B23B 2260/134* (2013.01); *B23C 2210/02* (2013.01); *B23C 2240/32* (2013.01); *B23P 11/027* (2013.01)

(58) Field of Classification Search
  CPC ... B23C 2210/02; B23B 31/005; B23B 31/02; B23B 31/028; B23B 31/1075; B23B 31/11; B23B 31/1122; B23B 31/1175; B23B 2240/32; B23B 2260/134; B23P 11/027
  See application file for complete search history.

(56) References Cited

U.S. PATENT DOCUMENTS

| | | | | |
|---|---|---|---|---|
| 2,104,799 A * | 1/1938 | Evans | ...................... | F16L 15/04 285/14 |
| 3,061,025 A | 10/1962 | Stockard, Jr. | | |
| 3,822,902 A * | 7/1974 | Maurer | ................ | F16L 15/003 285/94 |
| 4,548,431 A * | 10/1985 | Hall | ...................... | E21B 17/042 285/334 |
| 5,085,536 A * | 2/1992 | Pelton | ...................... | F16D 1/06 403/296 |
| 6,394,466 B1 * | 5/2002 | Matsumoto | ........... | B23B 31/008 279/103 |
| 6,886,484 B2 * | 5/2005 | Thomas | ................... | B63H 9/08 114/108 |
| 7,374,376 B2 * | 5/2008 | Jonsson | .............. | B23B 31/1107 279/8 |
| 7,513,724 B2 * | 4/2009 | Kakai | ..................... | B23B 31/11 279/8 |
| 7,611,311 B2 * | 11/2009 | Kakai | ................. | B23B 31/1107 279/8 |
| 7,815,403 B2 | 10/2010 | Hoefler et al. | | |
| 8,286,972 B2 * | 10/2012 | Haimer | ................... | B23C 5/003 279/102 |
| 8,931,983 B2 * | 1/2015 | Sharivker | ................ | B23C 5/10 408/233 |
| 2009/0010709 A1 * | 1/2009 | Berglow | ................. | B23C 5/10 403/343 |
| 2013/0028669 A1 * | 1/2013 | Cigni | ....................... | B23C 5/10 407/11 |
| 2014/0308082 A1 * | 10/2014 | Abe | ..................... | B23B 31/1122 407/37 |
| 2015/0030398 A1 * | 1/2015 | Frota De Souza | ..... | B23B 51/00 407/33 |
| 2015/0217380 A1 * | 8/2015 | Haimer | ............... | B23B 31/1115 279/99 |
| 2015/0360295 A1 * | 12/2015 | Haimer | ............... | B23B 31/1115 279/20 |
| 2016/0199918 A1 | 7/2016 | Langbein et al. | | |
| 2017/0043410 A1 | 2/2017 | Hecht | | |
| 2019/0126365 A1 * | 5/2019 | Osawa | ................ | B23B 31/1122 |

FOREIGN PATENT DOCUMENTS

| | | | | |
|---|---|---|---|---|
| EP | 3120958 B1 * | 11/2019 | ............. | B23C 5/10 |
| JP | H11-347811 A | 12/1999 | | |
| JP | 2005186240 A | 7/2005 | | |

\* cited by examiner

CUTTING TOOL AND METHOD OF ASSEMBLING CUTTING TOOL

CROSS-REFERENCE TO RELATED APPLICATION

Priority is claimed on Japanese Patent Application No. 2017-234548, filed Dec. 6, 2017, the content of which is incorporated herein by reference.

BACKGROUND

Field

The present disclosure relates to a cutting tool and a method of assembling the cutting tool.

Description of Related Art

As a type of cutting tool, for example, a tool called an end mill, types of which include a ball end mill, a radius end mill, a lollipop mill and the like, is known. Such a cutting tool includes a holder supported by a chuck of a machine tool, a shank that can be fixed to the holder, and a head detachably attached to a distal end portion of the shank. A blade is formed in the head. When the machine tool is driven, the blade rotates with the head in a predetermined direction. As a result, it is possible to apply a desired cutting process to a processing target (workpiece).

In addition to the cutting tool described above, turning tools used by being attached to a lathe are also widely known. In a turning process using the lathe, processing is performed by pressing a blade of the turning tool against a workpiece rotating around a main axis extending in a horizontal direction. As a specific example of such a turning tool, for example, one described in the following Patent Document 1 is known. In the tool described in Patent Document 1, a hole portion of a head portion is shrink-fitted to a shaft portion of a shank portion.

PATENT DOCUMENTS

[Patent Document 1] Japanese Unexamined Patent Application, First Publication No. 11-347811

Here, in the cutting tool such as the ball end mill, the radius end mill and the lollipop mill described above, since the tool itself (head) rotates to perform processing, the head is required to have high rigidity. Therefore, in order to secure the rigidity, it is also conceivable to apply the technique described in Patent Document 1 to the cutting tool. However, in the end mill, the frictional heat generated between the blade and the workpiece is large. Thus, in the tool according to the above-mentioned Patent Document 1, due to the heat expansion of the head, shrink fitting may become loose. That is, there is a possibility that sufficient rigidity of the tool will not be able to be secured.

The present disclosure provides a cutting tool having sufficient rigidity and a method of assembling the cutting tool.

SUMMARY

According to a first aspect of the present disclosure, there is provided a cutting tool which includes a shank which has a shank main body extending along an axis, and an insertion portion protruding from the shank main body toward one side in a direction of the axis; a head in which the insertion portion is able to be inserted and an insertion hole having a length in the direction of the axis shorter than the insertion portion is formed; and a spacer disposed between the shank main body and the head. The insertion portion has a male screw portion in which a male screw is formed on an outer circumferential surface in a distal end portion including an end portion on the one side in the direction of the axis, and a tapered outer circumferential portion in which a tapered outer circumferential surface which gradually decreases in diameter from the other side toward the one side in the direction of the axis is formed in a region on the other side in the direction of the axis with respect to the male screw portion. The insertion hole has a female screw meshing with the male screw in a region including an end portion on the one side in the direction of the axis on an inner surface, and a tapered inner circumferential surface which gradually decreases in diameter from the other side toward the one side in the direction of the axis and comes into surface contact with the tapered outer circumferential surface, in a region on the other side in the direction of the axis with respect to the female screw on the inner surface. A head end surface of the head which is an end surface facing the other side in the direction of the axis comes into surface contact with a surface of the spacer facing the one side in the direction of the axis.

According to this configuration, the female screw formed in the insertion hole of the head and the male screw formed in the insertion portion of the shank mesh with each other. Furthermore, the tapered outer circumferential surface of the insertion hole and the tapered inner circumferential surface of the insertion portion come into surface contact with each other, and the head end surface and the surface of the spacer facing the one side in the direction of the axis come into contact with each other. That is, the two surfaces are in surface contact with each other. This makes it possible to firmly couple the head and the shank as compared with a configuration in which a pair of surfaces are in contact with each other. In addition, since an attachment structure that uses thermal deformation, such as shrinkage fit, is not used, it is possible to avoid loosening or rattling of the tool due to heat input during processing and accuracy deterioration.

According to a second aspect of the present disclosure, in the first aspect, an angle formed by the tapered inner circumferential surface and the axis may be greater than an angle formed by the tapered outer circumferential surface and the axis.

According to this configuration, the angle formed by the tapered outer circumferential surface and the axis is greater than the angle formed by the tapered inner circumferential surface and the axis. Thus, in the state in which the shank and the head are assembled, it is possible to increase the surface pressure generated between the tapered outer circumferential surface and the tapered inner circumferential surface from the other side toward the one side in the direction of the axis. Therefore, the head and the shank can be more firmly coupled.

According to a third aspect of the present disclosure, in the first or second aspect, the tapered inner circumferential surface and the tapered outer circumferential surface may come into surface contact with each other by being plastically deformed.

According to this configuration, the tapered inner circumferential surface and the tapered outer circumferential surface come into surface contact with each other by being plastically deformed. Accordingly, it is possible to further increase the surface pressure generated between the tapered outer circumferential surface and the tapered inner circumferential surface. Therefore, the head and the shank can be more firmly coupled.

According to a fourth aspect of the present disclosure, there is provided a method of assembling the cutting tool according to any one of first to third aspects, the method including: a provisional inserting step of inserting the insertion portion into the insertion hole and adding a predetermined initial torque to cause the male screw and the female screw to mesh with each other to form a gap between the shank main body and the head; a measuring step of measuring a dimension of the gap between the shank main body and the head generated in the provisional inserting step and then detaching the head from the shank; a spacer processing step of processing the spacer having a thickness equal to or greater than the dimension of the gap measured in the measuring step; a spacer attaching step of attaching the spacer to the shank; and a final inserting step of bringing the tapered inner circumferential surface and the tapered outer circumferential surface into surface contact with each other, and bringing a head end surface, which is an end surface facing the other side in the direction of an axis, into surface contact with a surface of the spacer facing the one side in the direction of the axis, by applying a final torque greater than the initial torque to attach the head to the shank.

According to this method, after the insertion portion is inserted into the insertion hole by adding the initial torque in the provisional inserting step, the dimension of the gap between the shank and the head is measured in the measuring step. Based on this dimension, the spacer is machined in the spacer processing step. That is, the spacer attached to the shank in the subsequent spacer attaching step has a dimension which sufficiently fills the gap between the shank and the head at this stage. Further, in the final inserting step, the head is attached to the shank by adding a final torque greater than the initial torque. Thus, the spacer is plastically deformed and becomes smaller than the dimension of the final gap. Therefore, it is possible to sufficiently increase the surface pressure generated between the spacer and the head.

According to the present disclosure, it is possible to provide a cutting tool having sufficient rigidity and a method of assembling the cutting tool.

DETAILED DESCRIPTION

Figure 1:
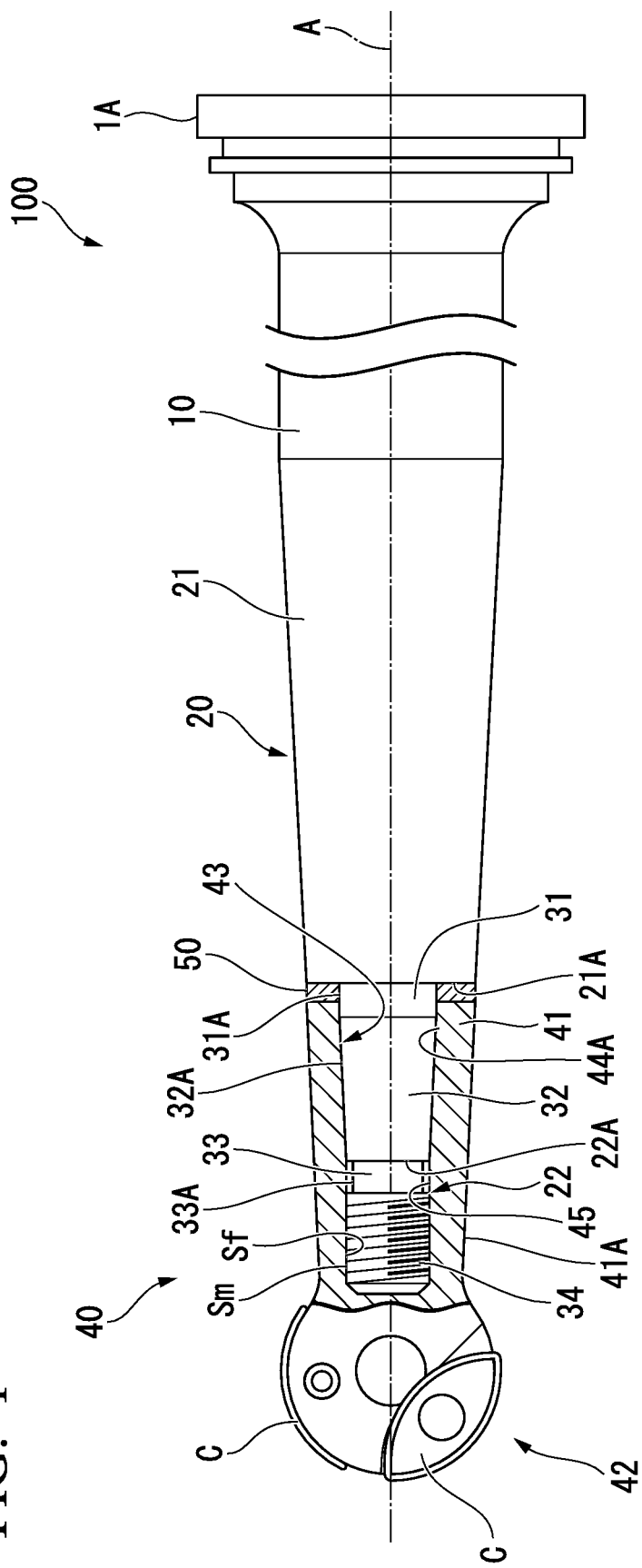
FIG. 1 is an overall view showing a configuration of a cutting tool according to an embodiment of the present disclosure.

A cutting tool 100 according to an embodiment of the present disclosure will be described with reference to the drawings. As shown in FIG. 1, the cutting tool 100 according to the present embodiment is used while attached to a chuck (not shown) of a machine tool. Specifically, the cutting tool 100 of the present embodiment is an end mill, more specifically, for example, a lollipop mill. The chuck rotates around an axis A in a state in which the cutting tool 100 is supported from the direction of the axis A.

Next, a detailed configuration of the cutting tool 100 will be described. The cutting tool 100 according to the present embodiment includes a holder 10, a shank 20, a head 40, and a spacer 50.

The holder 10 has a columnar shape around the axis A. An end portion (a proximal end portion 1A) on the other side (a second side) of the holder 10 in the direction of the axis A has a greater diameter dimension (a dimension in a radial direction around the axis A) than other portions. The proximal end portion 1A is fastened and fixed to the chuck of the above-mentioned machine tool.

The shank 20 connects the holder 10 and the head 40. The shank 20 of the present embodiment has a shank main body 21 and an insertion portion 22.

The shank main body 21 extends in a columnar shape along the axis A. Since a diameter dimension (a diameter dimension with respect to the axis A) gradually decreases from the proximal end portion 1A, which is the other side in the direction of the axis A, toward one side, the shank main body 21 has a tapered shape.

The insertion portion 22 is formed at an end portion on one side (a first side) in the direction of the axis A of the shank main body 21. The insertion portion 22 extends from the shank main body 21 toward the one side in the direction of the axis A. The insertion portion 22 protrudes from the first surface 21A, which is an end surface one side of the shank main body 21 in the direction of the axis A, toward the one side in the direction of the axis A. The first surface 21A is a plane expanding in a direction orthogonal to the axis A. The insertion portion 22 has substantially a rod shape around the axis Ar. The diameter dimension of the insertion portion 22 is smaller than the diameter dimension of the end portion on the one side of the shank main body 21 in the direction of the axis A. The insertion portion 22 is integrally formed of the same material as the shank main body 21.

Figure 2:
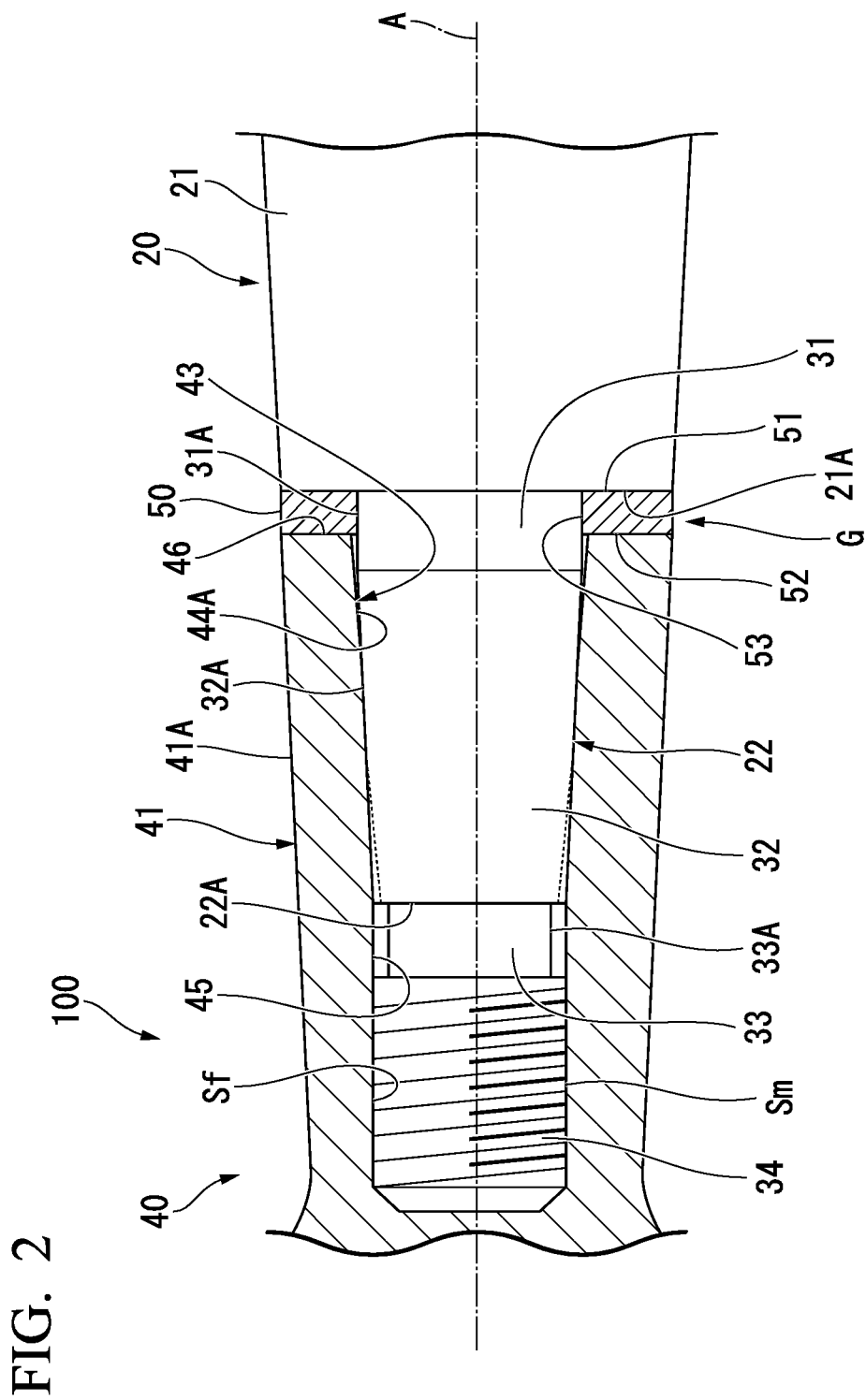
FIG. 2 is an enlarged cross-sectional view of a main part showing the configuration of the cutting tool according to the embodiment of the present disclosure.

More specifically, as shown in FIG. 2, the insertion portion 22 includes a first connecting portion 31 extending from the first surface 21A, a tapered outer circumferential portion 32 provided on the one side in the direction of the axis A with respect to the first connecting portion 31, a second connecting portion 33 provided on the one side in the direction of the axis A with respect to the tapered outer circumferential portion 32, and a male screw portion 34 provided on the one side in the direction of the axis A with respect to the second connecting portion 33.

The first connecting portion 31 has the same diameter dimension over the entire region in the direction of the axis A. The first connecting portion 31 is provided at the position of the axis A on the first surface 21A. The first connecting portion 31 has a circular cross section centered on the axis A when viewed from the direction of the axis A. A spacer 50 to be described later is attached to the outer circumferential side of the first connecting portion 31. In the present embodiment, the outer circumferential surface of the first connecting portion 31 is referred to as a first outer circumferential surface 31A.

The tapered outer circumferential portion 32 is provided integrally and coaxially with the first connecting portion 31. In other words, the tapered outer circumferential portion 32 and the first connecting portion 31 are centered on the axis A. The tapered portion 32 is formed in a region on the other side in the direction of the axis A with respect to the male screw portion 34. The tapered outer circumferential portion 32 has a circular cross section centered on the axis A when viewed from the direction of the axis A. The tapered outer circumferential portion 32 gradually decreases in diameter from the other side toward the one side in the direction of the axis A. That is, the diameter dimension of the tapered outer circumferential portion 32 gradually decreases from the other side toward the one side in the direction of the axis A. In the present embodiment, the outer circumferential surface of the tapered outer circumferential portion 32 is referred to as a tapered outer circumferential surface 32A. The tapered outer circumferential surface 32A has a conical surface shape centered on the axis A. The outer shape of the end portion of the tapered outer circumferential surface 32A on the other side in the direction of the axis A has the same diameter as the first outer circumferential surface 31A. In the tapered outer circumferential surface 32A, the outline of the second surface 22A, which is the end surface on one side in the direction of the axis A, has a smaller diameter than the first outer peripheral surface 31A. That is, since the diameter of the tapered outer circumferential portion 32 decreases from the other side toward the one side in the direction of the axis A, the area of the second surface 22A is smaller than the cross-sectional area of the above-described first connecting portion 31.

The second connecting portion 33 is provided integrally and coaxially with the tapered outer circumferential portion 32. The second surface 22A extends in a plane orthogonal to the axis A. The second connecting portion 33 has a circular cross section centered on the axis A as viewed from the direction of the axis A. The second connecting portion 33 extends from the second surface 22A to the one side in the direction of the axis A. The cross-sectional area of the second connecting portion 33 is smaller than the area of the second surface 22A. In the present embodiment, the outer circumferential surface of the second connecting portion 33 is referred to as a second outer circumferential surface 33A.

The male screw portion 34 is formed at a distal end portion of the insertion portion 22 including an end portion of the insertion portion 22 on the one side in the direction of the axis A. The male screw portion 34 extends from an end portion of the second connecting portion 33 on the one side in the direction of the axis A. The male screw portion 34 is provided integrally and coaxially with the second connecting portion 33. On the outer circumferential surface of the male screw portion 34, a male screw Sm having a spiral shape around the axis A is formed. The male screw Sm can mesh with a female screw Sf formed on the inner circumferential surface of the head 40 to be described later.

As shown in FIG. 1, the head 40 is a member attached to the above-described shank 20, and a blade (chip C) is attached to a distal end portion thereof. The head 40 is formed of a material different from that of the shank 20. The head 40 has a flange portion 41 which covers the insertion portion 22 from the outer circumferential side, and a head main body 42 integrally provided on the one side of the flange portion 41 in the direction of the axis A.

The flange portion 41 has a substantially cylindrical shape centered on the axis A. An outer circumferential surface 41A of the flange portion which is the outer circumferential surface of the flange portion 41 gradually decreases in diameter from the other side toward the one side in the direction of the axis A. Inside the flange portion 41, an insertion hole 43 into which the above-described insertion portion 22 can be inserted is formed.

As shown in FIG. 2, the insertion hole 43 is recessed toward the one side in the direction of the axis A from the end surface of the flange portion 41 on the other side in the direction of the axis A. The insertion hole 43 is shorter in length in the direction of the axis A than the insertion portion 22. On an inner surface of the insertion hole 43, a tapered inner circumferential surface 44A, a facing surface 45, and a female screw Sf are formed in order from the other side toward the one side in the direction of the axis A.

The tapered inner circumferential surface 44A forms a part of the inner circumferential surface of the insertion hole 43. The tapered inner circumferential surface 44A is provided in the region of the other side in the direction of the axis A with respect to the facing surface 45 and the female screw Sf, on the inner surface. The tapered inner circumferential surface 44A gradually decreases in diameter from the other side toward the one side in the direction of the axis A. Specifically, the tapered inner circumferential surface 44A has a conical surface shape centered on the axis A. In the state before assembly of the head 40 and the shank 20, an angle formed by the tapered inner circumferential surface 44A and the axis A in a cross section including the axis A is greater than an angle formed by the tapered outer circumferential surface 32A of the insertion portion 22 and the axis A. As will be described in detail later, in a state in which the head 40 and the shank 20 are assembled, at least some parts of the tapered inner circumferential surface 44A and the tapered outer circumferential surface 32A are in surface contact with each other. The diameter dimension of the end portion of the tapered inner circumferential surface 44A on the one side in the direction of the axis A is substantially the same as the diameter dimension of the end portion of the tapered outer circumferential surface 32A on the one side in the direction of the axis A. Since the angle formed by the tapered inner circumferential surface 44A and the axis A is greater than the angle formed by the tapered outer circumferential surface 32A and the axis A, at least some parts of the tapered inner circumferential surface 44A and the tapered outer circumferential surface 32A are in surface contact with each other in a state in which they are plastically deformed. In particular, the degree of plastic deformation is greater on the one side in the direction of the axis A.

The facing surface 45 forms a part of the inner circumferential surface of the insertion hole 43. The facing surface 45 is provided in a region between the tapered inner circumferential surface 44A and the female screw Sf on the inner surface. The facing surface 45 faces the second outer circumferential surface 33A of the second connecting portion 33 in the above-described insertion portion 22 in the radial direction of the axis A.

The female screw Sf forms a part of the inner circumferential surface of the insertion hole 43. The female screw Sf is provided on the one side in the direction of the axis A from the facing surface 45 and in a region including the end portion of the insertion hole 43 on the one side in the direction of the axis A. The female screw Sf can mesh with the male screw Sm of the male screw portion 34 formed in the above-described insertion portion 22.

As shown in FIG. 1, the head main body 42 has a spherical segment shape, and a pair of chips C having blades are attached to a part of the outer circumferential surface thereof. Here, the spherical segment shape is a shape of the larger volume portion among the two portions which cut a sphere with a plane that does not pass through the center of the sphere. More specifically, a plurality of chips C (two in the present embodiment) are attached to be spaced apart from the surface of the head main body 42. The chip C is detachably attached to the head main body 42 by, for example, bolts and nuts. That is, when the chip C is abraded or lost, it can be replaced with a new chip C. Further, in the present embodiment, each chip C has an arc-shaped blade, and it is possible to form a curved cutting surface on the workpiece.

Figure 4:
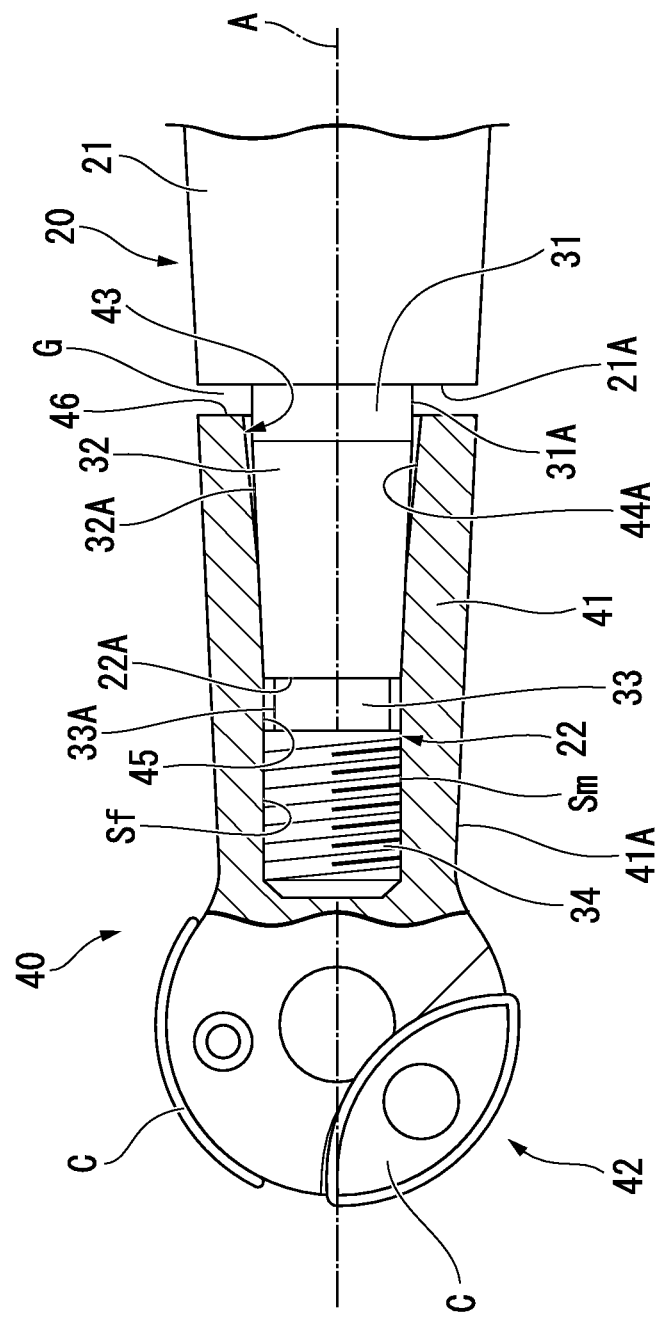
FIG. 4 is a view showing a state after the provisional inserting step in the method of assembling the cutting tool according to the embodiment of the present disclosure.

As shown in FIG. 4, in a state in which the head 40 is attached to the shank 20, a gap G extending in the direction of the axis A is formed between the head end surface 46 which is the end surface of the head 40 on the other side in the direction of the axis A and the first surface 21A of the shank 20.

The spacer 50 is disposed between the shank main body 21 and the head 40. Specifically, as shown in FIG. 2, the spacer 50 of this embodiment is accommodated in the gap G. The spacer 50 is in the shape of a ring centered on the axis A. As will be described in detail later, the dimension of the spacer 50 in the direction of the axis A is slightly greater than the dimension of the gap G in the direction of the axis A. That is, in a state in which the head 40 is attached to the shank 20, the spacer 50 is slightly crushed and deformed from both sides in the direction of the axis A between the head end surface 46 and the first surface 21A. In this way, the spacer 50 fills the gap G between the head end surface 46 and the first surface 21A.

The first surface 21A of the shank 20 comes into surface contact with a surface (a spacer first surface 51) facing the other side of the spacer 50 in the direction of the axis A. The head end surface 46 of the head 40 comes into surface contact with a surface (a spacer second surface 52) facing the one side of the spacer 50 in the direction of the axis A. The inner circumferential surface (a spacer inner circumferential surface 53) of the spacer 50 comes into surface contact with the outer circumferential surface (a first outer circumferential surface 31A) of the first connecting portion 31 of the insertion portion 22.

Figure 3:
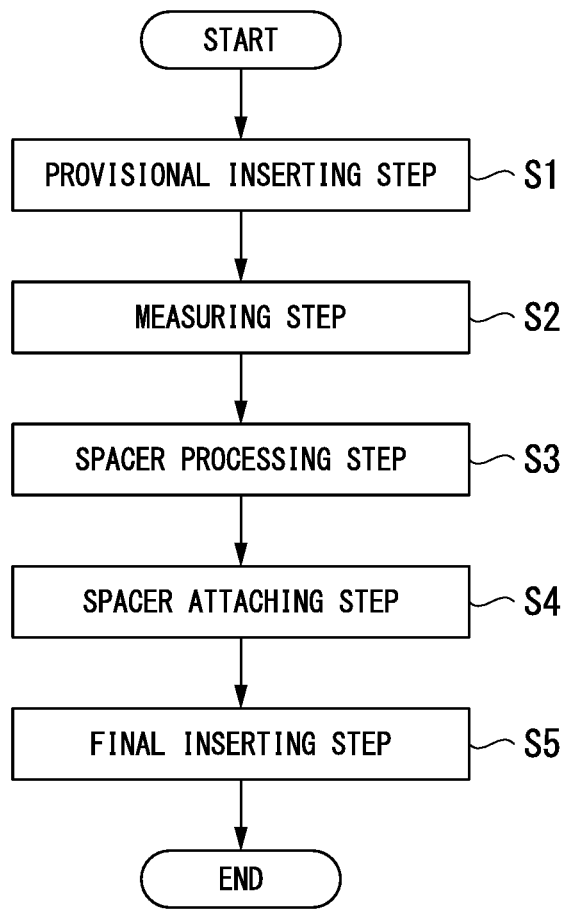
FIG. 3 is a flowchart showing processes of a method of assembling the cutting tool according to the embodiment of the present disclosure.

Next, a method of assembling the cutting tool 100 according to the present embodiment will be described with reference to FIGS. 1 to 5. As shown in FIG. 3, the method of assembling the cutting tool 100 includes a provisional inserting step S1, a measuring step S2, a spacer processing step S3, a spacer attaching step S4, and a final inserting step S5.

In the provisional inserting step S1, as shown in FIG. 4, the head 40 is attached to the shank 20 in a state in which the spacer 50 is not attached. At this time, the distal end portion of the male screw Sm formed in the insertion portion 22 first meshes with the female screw Sf formed in the insertion hole 43. At the same time, the tapered outer circumferential surface 32A and the tapered inner circumferential surface 44A come into contact with each other.

Since the angle formed by the tapered inner circumferential surface 44A and the axis A is greater than the angle formed by the tapered outer circumferential surface 32A and the axis A, the required torque gradually increases as the male screw Sm is screwed into the female screw Sf. The torque required at this time is set as an initial torque. The initial torque is a predetermined torque, for example, a torque at which the tapered inner circumferential surface 44A and the tapered outer circumferential surface 32A come into contact with each other without plastic deformation. When the initial torque is added, the insertion portion 22 of the shank 20 is inserted into the insertion hole 43 of the head 40 until the male screw Sm and the female screw Sf mesh with each other. As a result, a gap G is formed between the shank main body 21 and the head 40. In this way, the provisional inserting step S1 is completed.

Next, in the state in which the provisional inserting step S1 is completed, the measuring step S2 is executed. In the measuring step S2, the dimension in the direction of the axis A of the gap G between the head end surface 46 of the head 40 and the first surface 21A of the shank 20 is measured. A well-known measuring device such as a caliper or a micrometer is suitably used for the measurement. After the measurement is completed, the head 40 is detached from the shank 20. Thus, the measuring step S2 is completed.

Subsequently, after the measuring step S2, the spacer processing step S3 is executed. In the spacer processing step S3, the spacer 50 is fabricated on the basis of the dimension in the direction of the axis A of the gap G between the head end surface 46 and the first surface 21A obtained in the above measuring step S2. Specifically, by processing an element body of the spacer 50 which is roughly cut to rough dimensions, the spacer 50 which has a thickness equal to or greater than the dimension in the direction of the axis A of the gap G obtained in the measuring step S2 is fabricated. Here, the thickness of the spacer 50 is preferably the same thickness as the dimension of the gap G in the direction of the axis A or slightly greater than the dimension of the gap G in the direction of the axis A. Specifically, when the thickness of the spacer 50 is greater than the dimension of the gap G, the thickness of the spacer 50 is preferably 130% or less of the dimension in the direction of the axis A of the gap G, more preferably 120% or less. Thus, the spacer processing step S3 is completed.

Figure 5:
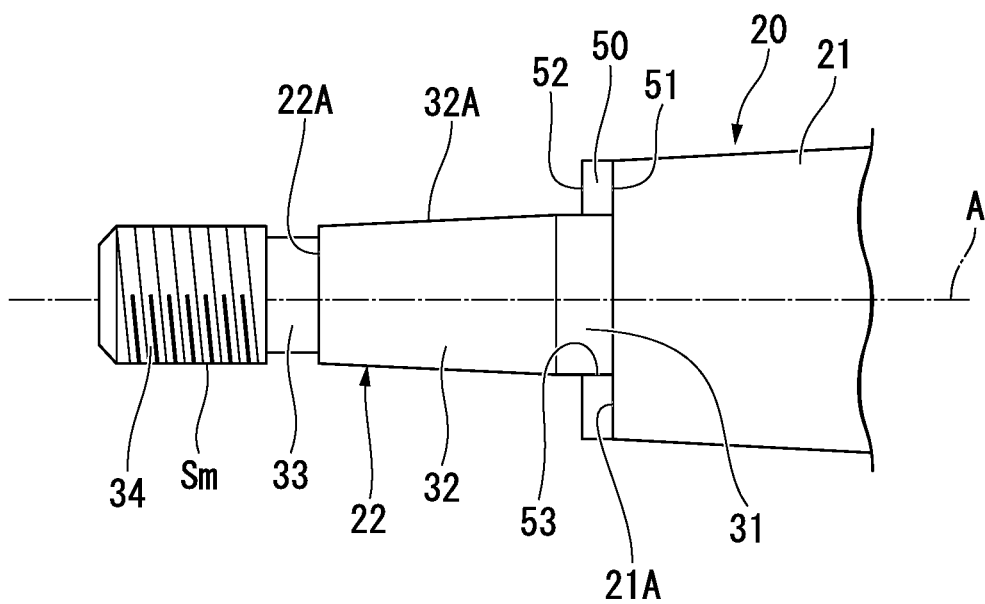
FIG. 5 is a view showing a state after a spacer attaching step in the method of assembling the cutting tool according to the embodiment of the present disclosure.

Next, the spacer attaching step S4 is executed. As shown in FIG. 5, the spacer 50 is attached to the shank 20 with the head 40 removed. At this time, the spacer 50 is attached so that the spacer first surface 51 of the spacer 50 and the first surface 21A of the shank 20 come into contact with each other. At this time, the inner circumferential surface 53 of the spacer and the outer circumferential surface (the first outer circumferential surface 31A) of the first connecting portion 31 are brought into contact with each other. Thus, the spacer attaching step S4 is completed.

Subsequently, the final inserting step S5 is executed. In the final inserting step S5, in a state in which the spacer 50 is attached to the shank 20, a final torque greater than the initial torque is added to the head 40 and attached to the shank 20. The final torque is a torque that is several % greater than the initial torque and is a torque that is great enough that the spacer 50 does not rotate when sandwiched between the head end surface 46 and the first surface 21A. By adding the final torque, the insertion portion 22 is inserted further into the insertion hole 43 as compared to the provisional inserting step S1. As a result, the tapered inner circumferential surface 44A and the tapered outer circumferential surface 32A are brought into surface contact with each other in the region on the one side in the direction of the axis A in a state in which they are plastically deformed. At the same time, the head end surface 46 and the spacer second surface 52 are brought into surface contact with each other. As a result, the state shown in FIG. 1 and FIG. 2 is obtained, and the final inserting step S5 is completed. If a step or the like is generated between the outer circumferential surface of the spacer 50 and the outer circumferential surface 41A of the flange portion after the final inserting step S5 is completed, a step of removing the step or the like may be executed.

As described above, since the angle formed by the tapered inner circumferential surface 44A and the axis A is greater than the angle formed by the tapered outer circumferential surface 32A and the axis A, as the male screw Sm is screwed into the female screw Sf, the required torque gradually increases. At this time, until the entire male screw Sm and the female screw Sf mesh with each other in the state in which a final torque greater than the above-described initial torque is applied, the insertion portion 22 of the shank 20 is inserted into the insertion hole 43 of the head 40. Therefore, the tapered inner circumferential surface 44A and the tapered outer circumferential surface 32A come into contact with each other in a state in which at least a part thereof is plastically deformed. At the same time, the dimension of the gap G in the direction of the axis A is smaller than the dimension in the measuring step S2 after the provisional inserting step S1. As a result, the spacer 50 is crushed and deformed from both sides in the direction of the axis A. That is, the two surfaces of the tapered inner circumferential surface 44A and the tapered outer circumferential surface 32A, the head end surface 46 and the spacer second surface 52, and the first surface 21A and the spacer first surface 51 are brought into contact with each other under high surface pressure (in a state of surface contact).

Subsequently, an example of a method of using the cutting tool 100 according to the present embodiment will be described. In using the cutting tool 100, the machine tool is driven in a state in which the holder 10 is supported by the chuck of the machine tool. As a result, the chuck rotates around the axis A, and the cutting tool 100 also rotates about the axis A. In this state, the blade (chip C) of the cutting tool 100 is brought into contact with the surface of the workpiece, and the cutting is carried out for the desired cutting amount. At this time, stress due to contact with the workpiece is generated in the cutting tool 100. However, in the cutting tool 100 according to the present embodiment, as described above, since the two surfaces of the tapered inner circumferential surface 44A and the tapered outer circumferential surface 32A, and the head end surface 46 and the first surface 21A are brought into contact with each other under high surface pressure (in a state of surface contact), high rigidity is secured and cutting work can be performed in a stable state.

As described above, according to the configuration of the present embodiment, the female screw Sf formed in the insertion hole 43 of the head 40 and the male screw Sm formed in the insertion portion 22 of the shank 20 mesh with each other. Furthermore, the tapered outer circumferential surface 32A of the insertion hole 43 and the tapered inner circumferential surface 44A of the insertion portion 22 come into surface contact with each other, the head end surface 46 and the spacer second surface 52 come into contact with each other, and the first surface 21A and the spacer first surface 51 come into contact with each other. That is, the two surfaces are in state of being in surface contact with each other. This makes it possible to firmly couple the head 40 and the shank 20 as compared with a configuration in which a pair of surfaces are in contact with each other. In addition, since the attachment structure accompanied by thermal deformation, such as shrinkage fit, is not used, it is possible to avoid loosening or rattling of the tool due to heat input during processing and accuracy deterioration.

Further, according to the above-described configuration, since the angle formed by the tapered outer circumferential surface 32A and the axis A is greater than the angle formed by the tapered inner circumferential surface 44A and the axis A, in the state of assembling the shank 20 and the head 40, it is possible to increase the surface pressure generated between the tapered outer circumferential surface 32A and the tapered inner circumferential surface 44A from the other side toward the one side in the direction of the axis A. Therefore, the head 40 and the shank 20 can be more firmly coupled.

In addition, according to the above-described configuration, since the tapered inner circumferential surface 44A and the tapered outer circumferential surface 32A come into surface contact with each other accompanying plastic deformation, it is possible to further increase the surface pressure generated between the tapered outer circumferential surface 32A and the tapered inner circumferential surface 44A. Therefore, the head 40 and the shank 20 can be more firmly coupled.

According to the method of assembling the cutting tool 100 described above, after inserting the insertion portion 22 into the insertion hole 43 by adding the initial torque in the provisional inserting step S1, the dimension of the gap G between the shank 20 and the head 40 is measured by the measuring step S2. Based on this dimension, the spacer 50 is machined by the spacer processing step S3. That is, the spacer 50 attached to the shank 20 in the subsequent spacer attaching step S4 has a dimension which sufficiently fills the gap G between the shank 20 and the head 40 at this stage. Further, in the final inserting step S5, since the head 40 is attached to the shank 20 by adding a final torque greater than the initial torque, the spacer 50 is plastically deformed and becomes smaller than the dimension of the final gap G. Therefore, it is possible to sufficiently increase the surface pressure generated between the spacer 50 and the head 40.

Another Modified Example of Embodiment

Although the embodiments of the present disclosure have been described above in detail with reference to the drawings, the respective configurations and combinations thereof in the respective embodiments are merely examples, and additions, omissions substitutions and other changes of configurations can be made within the scope that does not depart from the gist of the present disclosure. Further, the present disclosure is not limited by the embodiments, and is limited only by the claims.

For example, in the above embodiment, an example in which a lollipop mill is adopted as the head 40 has been described. However, the shape of the head 40 is not limited to the above shape, and it is possible to use a ball end mill or a radius end mill as the head 40.

Further, the tapered inner circumferential surface 44A and the tapered outer circumferential surface 32A are not limited to the configuration in which the tapered inner circumferential surface 44A and the tapered outer circumferential surface 32A come into surface contact with each other by being plastically deformed as in this embodiment. The tapered inner circumferential surface 44A and the tapered outer circumferential surface 32A may not be plastically deformed as long as at least some parts thereof come into surface contact with each other.

EXPLANATION OF REFERENCES

10 Holder
20 Shank
21 Shank main body
22 Insertion portion
31 First connecting portion
32 Tapered outer circumferential portion
33 Second connecting portion
34 Male screw portion
40 Head
41 Flange portion
42 Head main body
43 Insertion hole 45 Facing surface
46 Head end surface
50 Spacer
51 Spacer first surface
52 Spacer second surface
53 Spacer inner circumferential surface
100 Cutting tool
1A Proximal end portion
21A First surface
22A Second face
31A First outer circumferential surface
32A Tapered outer circumferential surface
33A Second outer circumferential surface
41A Outer circumferential surface of flange portion
44A Tapered inner circumferential surface
A Axis
C Chip
G Gap
S1 provisional inserting step
S2 Measuring step
S3 Spacer processing step
S4 Spacer attaching step
S5 Final inserting step
Sf Female screw
Sm Male screw

What is claimed is:

1. A cutting tool comprising:
a shank which has a shank main body extending along an axis, and an insertion portion protruding from the shank main body toward one side in a direction of the axis;
a head in which the insertion portion is able to be inserted and an insertion hole having a length in the direction of the axis shorter than the insertion portion is formed; and
a spacer disposed between the shank main body and the head, wherein the insertion portion has:
  a male screw portion in which a male screw is formed on an outer circumferential surface in a distal end portion including an end portion on the one side in the direction of the axis;
  a tapered outer circumferential portion in which a tapered outer circumferential surface which gradually decreases in diameter from the other side toward the one side in the direction of the axis is formed in a region on the other side in the direction of the axis with respect to the male screw portion; and
  a second connecting portion connecting the male screw portion and the tapered outer circumferential portion and having a smaller cross-sectional area than cross-sectional areas of the male screw portion and an end surface on one side in the direction of the axis of the tapered outer circumferential portion,
the insertion hole has:
  a female screw meshing with the male screw in a region including an end portion on the one side in the direction of the axis on an inner surface; and
  a tapered inner circumferential surface which gradually decreases in diameter from the other side toward the one side in the direction of the axis and comes into surface contact with the tapered outer circumferential surface, in a region on the other side in the direction of the axis with respect to the female screw on the inner surface,
a head end surface of the head which is an end surface facing the other side in the direction of the axis comes into surface contact with a surface of the spacer facing the one side in the direction of the axis,
a gap is formed between the head end surface and a shank end surface which is an end surface of the shank facing one side in the direction of the axis,
a dimension of the spacer in the direction of the axis is greater than a dimension of the gap in the direction of the axis,
the spacer is disposed in the gap in a state of being crushed and deformed in the direction of the axis so as to fill the gap,
at an end closest to the female screw in the direction of the axis, a diameter of the tapered inner circumferential surface of the insertion hole is the same as a diameter of the tapered outer circumferential surface of the insertion portion, and
at an end farthest from the female screw in the direction of the axis, the diameter of the tapered inner circumferential surface of the insertion hole is larger than the diameter of the tapered outer circumferential surface of the insertion portion, and a gap is formed between the tapered inner circumferential surface of the insertion hole and the tapered outer circumferential surface of the insertion portion.

2. The cutting tool according to claim 1, wherein an angle formed by the tapered inner circumferential surface and the axis is greater than an angle formed by the tapered outer circumferential surface and the axis.

3. The cutting tool according to claim 1, wherein the tapered inner circumferential surface and the tapered outer circumferential surface come into surface contact with each other by being plastically deformed.

4. A method of assembling the cutting tool according to claim 1, the method comprising:
a provisional inserting step of inserting the insertion portion into the insertion hole and adding a predetermined initial torque to cause the male screw and the female screw to mesh with each other to form a gap between the shank main body and the head;
a measuring step of measuring a dimension of the gap between the shank main body and the head generated in the provisional inserting step and then detaching the head from the shank;
a spacer processing step of processing the spacer having a thickness equal to or greater than the dimension of the gap measured in the measuring step;
a spacer attaching step of attaching the spacer to the shank; and
a final inserting step of bringing the tapered inner circumferential surface and the tapered outer circumferential surface into surface contact with each other, and bringing a head end surface, which is an end surface facing the other side in the direction of the axis, into surface contact with a surface of the spacer facing the one side in the direction of the axis, by applying a final torque greater than the initial torque to attach the head to the shank.

5. The cutting tool according to claim 2, wherein the tapered inner circumferential surface and the tapered outer circumferential surface come into surface contact with each other by being plastically deformed.

6. A method of assembling the cutting tool according to claim 2, the method comprising:
a provisional inserting step of inserting the insertion portion into the insertion hole and adding a predetermined initial torque to cause the male screw and the female screw to mesh with each other to form a gap between the shank main body and the head;

a measuring step of measuring a dimension of the gap between the shank main body and the head generated in the provisional inserting step and then detaching the head from the shank;

a spacer processing step of processing the spacer having a thickness equal to or greater than the dimension of the gap measured in the measuring step;

a spacer attaching step of attaching the spacer to the shank; and a final inserting step of bringing the tapered inner circumferential surface and the tapered outer circumferential surface into surface contact with each other, and bringing a head end surface, which is an end surface facing the other side in the direction of the axis, into surface contact with a surface of the spacer facing the one side in the direction of the axis, by applying a final torque greater than the initial torque to attach the head to the shank.

7. A method of assembling the cutting tool according to claim 3, the method comprising:

a provisional inserting step of inserting the insertion portion into the insertion hole and adding a predetermined initial torque to cause the male screw and the female screw to mesh with each other to form a gap between the shank main body and the head;

a measuring step of measuring a dimension of the gap between the shank main body and the head generated in the provisional inserting step and then detaching the head from the shank;

a spacer processing step of processing the spacer having a thickness equal to or greater than the dimension of the gap measured in the measuring step;

a spacer attaching step of attaching the spacer to the shank; and a final inserting step of bringing the tapered inner circumferential surface and the tapered outer circumferential surface into surface contact with each other, and bringing a head end surface, which is an end surface facing the other side in the direction of the axis, into surface contact with a surface of the spacer facing the one side in the direction of the axis, by applying a final torque greater than the initial torque to attach the head to the shank.

8. A method of assembling the cutting tool according to claim 5, the method comprising:

a provisional inserting step of inserting the insertion portion into the insertion hole and adding a predetermined initial torque to cause the male screw and the female screw to mesh with each other to form a gap between the shank main body and the head;

a measuring step of measuring a dimension of the gap between the shank main body and the head generated in the provisional inserting step and then detaching the head from the shank;

a spacer processing step of processing the spacer having a thickness equal to or greater than the dimension of the gap measured in the measuring step;

a spacer attaching step of attaching the spacer to the shank; and a final inserting step of bringing the tapered inner circumferential surface and the tapered outer circumferential surface into surface contact with each other, and bringing a head end surface, which is an end surface facing the other side in the direction of the axis, into surface contact with a surface of the spacer facing the one side in the direction of the axis, by applying a final torque greater than the initial torque to attach the head to the shank.

\* \* \* \* \*